United States Patent [19]
Klapwijk

[11] 3,900,541
[45] Aug. 19, 1975

[54] METHOD OF RESTORING A WOODEN BEAM

[75] Inventor: Dick Klapwijk, Brielle, Netherlands

[73] Assignee: Bouweconomisch en Technologisch Adviesbureau B.V., Rotterdam, Netherlands

[22] Filed: June 18, 1973

[21] Appl. No.: 370,827

[52] U.S. Cl. ..................... 264/35; 52/289; 52/514; 52/744; 264/36; 264/263; 425/DIG. 36
[51] Int. Cl. ............................................. E04b 1/16
[58] Field of Search .......... 264/35, 36, 263; 52/289, 52/514, 744; 425/DIG. 36

[56] References Cited
UNITED STATES PATENTS

| | | | |
|---|---|---|---|
| 3,646,720 | 3/1972 | Watts | 52/744 |
| 3,716,608 | 2/1973 | Neumann | 264/36 |

FOREIGN PATENTS OR APPLICATIONS

| | | | |
|---|---|---|---|
| 419,560 | 3/1967 | Switzerland | 52/514 |

Primary Examiner—Robert F. White
Assistant Examiner—Thomas P. Pavelko
Attorney, Agent, or Firm—Diller, Brown, Ramik & Wight

[57] ABSTRACT

A wooden beam having an affected end supported in a wall is restored inserting a reinforcement taking up shearing forces with clearance through at least one hole made in the wood, and injecting a hardening synthetic resin grout into the affected region for replacing destroyed wood portions and saturating and completely penetrating decayed wood, said grout comprising a synthetic resin having strongly cementitious properties, such as an epoxy resin, and filling up the hole for the reinforcement with said grout so that said grout with the reinforcement embedded therein completely fills the hole.

4 Claims, 1 Drawing Figure

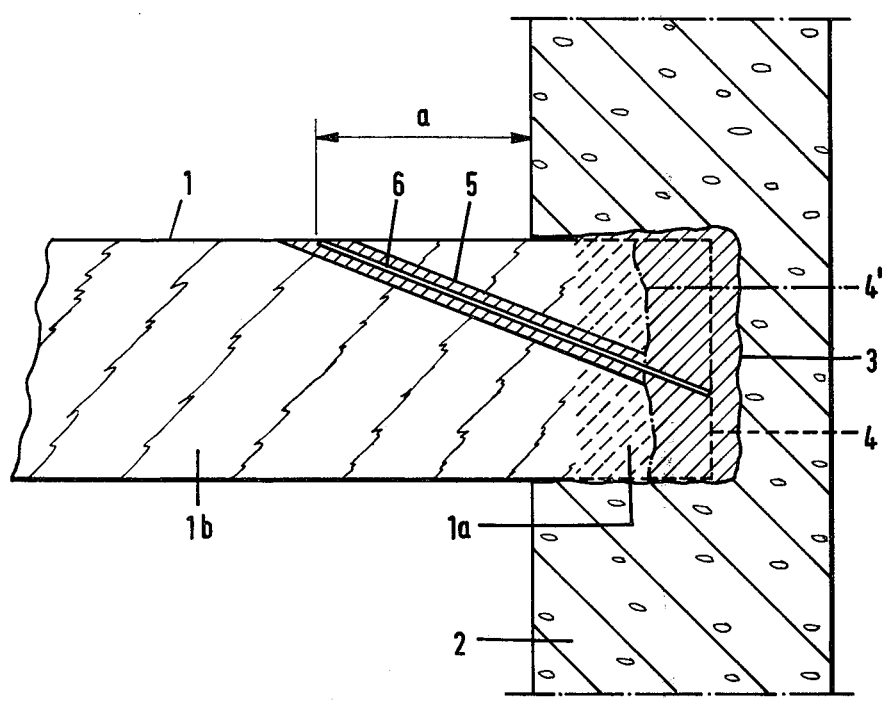

METHOD OF RESTORING A WOODEN BEAM

This invention relates to a method of restoring a wooden beam having an affected end supported in a wall or other support construction.

In buildings existing for quite some time it often occurs that heavy beams, in particular tie beams are strongly affected by decay at an end supported in a wall or like support. In most cases the rest of the beam is still in excellent state.

Often the extreme end of the beam is completely destroyed by decay, while an adjacent portion, still being within the wall, may be heavily deteriorated and in actual fact no longer able to carry loads. It will be clear that a remaining sound or partly sound beam portion still supported in the wall is hence too heavily loaded. Especially in the case of heavy beams, such as tie beams, supporting floor or a roof construction, a dangerous situation may result therefrom. Through the shearing forces in the wood in the area of support there is a danger of collapse or at least serious sagging.

In such cases restoration has to take place as rapidly as possible. Hitherto this has been done by providing the beams with new end sections. These had to replace the decayed portions, using scarfed joints or like constructions for connection with the sound portion of the beam. To obtain a solid connection such joint constructions extend over a considerable length in the area of support of the beam and hence are exposed to view, which is hardly justified aesthetically. Moreover, a considerable length of the beam has to be removed completely, including a still sound piece, and hence elaborate and often complicated work is required in erecting auxiliary support structures and working the beam.

Often it would be simpler to the entire beam, but for the fact that in many cases the required type of wood is not available or hardly available at present or would be much too expensive.

It is an object of the present invention to provide a method of restoring a beam whereby the drawbacks inherent in prior methods are obviated.

According to the invention, there is provided a method of restoring a wooden beam having an affected end, supported in a wall or other support construction, which comprises inserting a reinforcement taking up shearing forces with clearance through at least one hole made in the wood, and injecting a hardening synthetic resin grout into the affected region for replacing destroyed wood portions and saturating and completely penetrating decayed wood, said grout comprising a synthetic resin having strongly cementitious properties, such as an epoxy resin, and filling up the hole for the reinforcement with said grout so that said grout with the reinforcement embedded therein completely fills the hole.

Through the application of this method the supported part of the beam is considerably reinforced on the one hand by the reinforcement taking up shearing forces and on the other hand by the replacement of the lacking portions of the original beam profile with the hardened synthetic resin material and the impregnation of the decayed or otherwise deteriorated portion.

The reinforcement is strongly anchored by the surrounding synthetic resin material in the still sound wood, partly in the impregnated, improved wood, and partly in the synthetic resin material injected additionally at the end for replacing the destroyed beam portion, which successive portions are thus in turn very strongly anchored to the still sound wood of the beam.

According to the invention the synthetic resin grout is preferably injected via the hole for receiving the reinforcement. Although this method has the advantage that it is not necessary to make a hole in the wall to reach the space to be filled with grout, injection through the hole for receiving the reinforcement is naturally not strictly necessary. For instance, when a beam is supported in an outer wall, it may be advantageous to drill holes from the outside to the space to be injected and into and even through the area of support of the beam itself. In such a case the reinforcement is inserted and the grout injected from the outside.

It will generally depend on circumstances whether first the grout is injected and then the reinforcement applied in the hole or the other way round, i.e., first the reinforcement is installed in the hole, followed by injecting the grout.

In accordance with a further feature of the invention, a tubular reinforcement is used and at least part of the synthetic resin grout is injected through said tubular reinforcement.

The invention also relates to a wooden beam restored at its supported end by the above described method.

Two embodiments of the invention will now be described by way of example, with reference to the accompanying drawing.

The drawing is a part-sectional side view of a first embodiment of a wooden beam restored in its supported area by through application of the invented method.

Referring to the drawing, there is shown a wooden beam 1, originally extending into a wall 2 as shown by broken lines 4. Reference numeral 3 designates the inner contour of the hole in the wall for accommodating the supported end of the beam.

The area enclosed by the broken lines 4 and a dash-dot line 4' in the FIGURE is a portion of the beam 1 that has completely rotten away. At the left-hand side bordering on the dash-dot line 4 there is an area 1a which has been affected by decay and indicated in the FIGURE by a area hatched with broken lines. It lacks the strength and coherence of the structure of the wood of the original beam 1, being porous and incapable of taking up substantial forces.

According to the invented method a hole 5 has been drilled through the beam from a spot in the top surface 1b of beam 1 at a distance a of approx. 50 – 60 cm from wall 2, slightly sloping downwardly towards the wall, which hole, at the dash-dot line 4', leaves the still present, but locally affected wood material 1a just below the middle of the height. A reinforcement rod 6 extends axially through hole 5 for some distance into the area hatched with fully drawn lines.

The clearance between reinforcement rod 6 and the wall of hole 5 and the area hatched with fully drawn lines within the contour line 3 have been filled with an epoxy resin grout which injected under pressure through hole 5. During the injection the area hatched with broken lines has at the same time been fully impregnated with the epoxy resin grout. After hardening the beam is restored. It is reinforced by the reinforcement 6 embedded in the epoxy resin material, the previously porous and affected wood material at the right-hand side in the FIGURE is improved by impregnation and it is filled up with epoxy resin material at the right-hand side of the dash-dot line 4' in the FIGURE. This material has also the property of strongly adhering to the surrounding brickwork, so that a particularly solid anchoring and support is obtained as a result of the restoration performed. The reinforcement 6 also anchors the "new" beam portion formed by the epoxy resin to the sound portion of the beam.

Naturally it is also possible to insert the rod 6 after the epoxy resin material has been injected.

Instead of the above-described method it is possible, in particular when the beam end is supported in an outside wall, to make a hole through the wall from the outside into the space wherein wood material has decayed and extending over a major portion of the length of the hole 5 in the sound wood shown in the FIGURE. The epoxy resin compound can then be injected from the outside. The reinforcement can also be inserted from the outside.

The reinforcement may be a metal rod or a tube. It is also possible to use another appropriate material for this purpose, for example a glass-fiber-reinforced plastic rod.

If there is a risk that during injection the injected synthetic resin material leaks from the space to be filled via permeable parts of the wall before said space has been solidly filled up, such permeable spots may be first sealed with epoxy resin compound with a certain quantity of sand as filler material.

Through application of the invented method very large beams may be effectively restored at their supported ends. The method is of particular benefit in the case of beams with wood carvings or paintings which are to be preserved or in cases when the hitherto applied replacement involves undue hazards.

It will be clear that the invention is not limited to the embodiment described and shown in the drawing but that modifications may be made without departing from the scope of the invention as determined by the appended claims.

I claim:

1. A method of restoring an end portion of a wooden beam forming a part of a building structure wherein the beam includes a solid portion and an end portion at least initially in structural engagement with a cooperating part of the building structure, and wherein at least a part of said end portion has disappeared through decay and the like and there is a confined hollow space between said solid portion and the cooperating part of the building structure in place of the part of the end portion, said method comprising the steps of boring a hole in the solid portion of the beam and in communication with the hollow space, said hole being elongated as compared to a transverse dimension thereof, placing a unitary mass of synthetic resin grout of the type having highly cementitious properties such as epoxy resin in the hollow space and into the hole in filling relation with the grout bridging between the solid beam portion and the hollow space, placing a reinforcement within the hollow space and the hole with the reinforcement extending substantially the full length of the hole and the hollow space in the direction of the hole, and thereafter permitting the synthetic resin grout to harden to form a monolithic mass with the reinforcement embedded therein.

2. The method of claim 5 wherein the hole is bored into the beam initiating at a point remote from the hollow space, and the synthetic resin grout and the reinforcement are inserted into place through the hole.

3. The method of claim 5 wherein the reinforcement includes a hollow tube, and the synthetic reinforcement is introduced into place at least partially through the hollow tube.

4. The method of claim 5 wherein the end portion of the beam is engaged with another portion of the building structure and the hole is drilled first through the another building structure portion into the hollow space and then into the beam.

* * * * *